United States Patent [19]

Hashimoto et al.

[11] 4,172,633
[45] Oct. 30, 1979

[54] FOLDED STEREOSCOPE

[75] Inventors: Masahide Hashimoto; Shinjiro Hashimoto; Jisuke Hashimoto, all of Tokyo, Japan

[73] Assignee: Tokyo Shashin Co., Inc., Tokyo, Japan

[21] Appl. No.: 933,023

[22] Filed: Aug. 11, 1978

[30] Foreign Application Priority Data

Oct. 3, 1977 [JP] Japan .................... 52/133772[U]

[51] Int. Cl.² .................... G02B 27/04; G02B 27/22
[52] U.S. Cl. .................................................. 350/140
[58] Field of Search ................ 350/140, 143, 145, 70; 40/365

[56] References Cited

FOREIGN PATENT DOCUMENTS 49-55074 5/1974 Japan .......................... 350/140

Primary Examiner—Jon W. Henry
Attorney, Agent, or Firm—Fleit & Jacobson

[57] ABSTRACT

A folded stereoscope is assembled from a single sheet of material. The sheet is generally in the form of a rectangle provided with a cut-away portion. The sheet plate comprises an upper portion having lenses, a first lower portion connected to the upper portion through a fold line and a second lower portion connected to said first lower portion through another fold line and separated from the upper portion by the cut-away portion.

7 Claims, 4 Drawing Figures

FOLDED STEREOSCOPE

This invention relates to a stereoscope, more particularly, improvements in the stereoscope disclosed in the Japanese Utility Model Publication 22276/1977.

BACKGROUND OF THE INVENTION

Many stereoscopes including folded stereoscopes have been proposed. In one conventional type, the folded stereoscope is assembled into a box shape and in another, the stereoscope has portions which require paste for connection between the portions as disclosed the above mentioned Japanese Utility Model Publication 22276/1977. In these folded stereoscope, production must be done manually due to the difficulty in automation of mass production. Consequently, the cost of manufacture is high. Further, the body of these conventional stereoscope occupies much space and cannot be easily put into a flat configuration when folded.

SUMMARY OF THE INVENTION

It is, therefore, a main object of the invention to provide a very simple folded stereoscope which can be readily manufactured at low cost and is convenient to carry.

Another object of the invention is to provide a folded stereoscope which is made of a single sheet of material provided with a few fold lines and a few cut away portions and which can be readily assembled and disassembled.

A further object of the invention is to provide a stereoscope which occupies less space when folded.

A further object of the invention is to provide a stereoscope in which a partition wall can be accurately set perpendicular to and between photographs for stereoscopic viewing in order to give a good stereoscopic image to the viewer.

In accordance with the present invention there is provided a folded stereoscope which comprises a relatively rigid sheet of material generally in the form of a rectangle provided with a cut away portion cut from one side edge thereof, the sheet comprising an upper flap portion provided with two apertures spaced at a distance substantially equal to the distance between human eyes, each of said apertures being provided with a lens, a first lower flap portion connected to said upper flap portion through a first fold line and a second lower flap portion connected to said first lower flap portion through a second fold line and separated from said upper flap portion by said cut away portion.

BRIEF DESCRIPTION OF THE DRAWING

The invention will be now explained with reference to the accompanying drawings.

Referring now to FIGS. 1 and 3, a sheet 1 which is to be assembled into a stereoscope 20 as shown in FIGS. 2 and 4, hereinafter described in more detail is preferably made of a relatively rigid synthetic resin sheet or card board which permits thin fold lines to be made on its surface easily.

Figure 1:
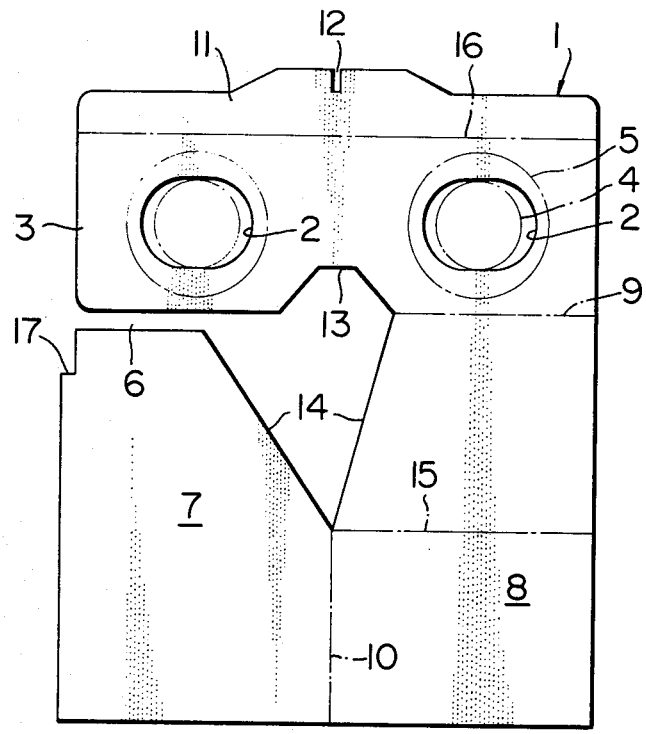
FIG. 1 shows a plan view of one embodiment of a sheet for use in a stereoscope according to the present invention before assembly.

The sheet 1 is generally in the form of a rectangle and is provided with a cut away portion 6. A laterally extending fold line 9 and a longitudinally extending fold line 10 are provided on the sheet 1 for forming an upper flap portion 3, a lower flap portion 8 or 8' and another flap portion 7 as shown in FIGS. 1 and 3.

Figure 3:
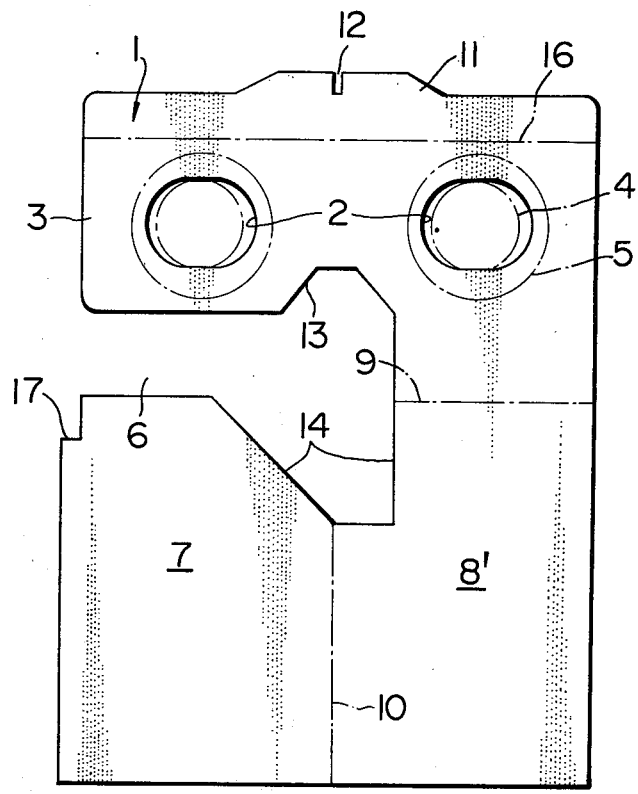
FIG. 3 shows a plan view of another embodiment of a sheet similar to that of FIG. 1.

More particularly, the cut away portion 6 is provided on the sheet 1 by cutting out a portion from one side thereof (the left side as shown in FIGS. 1 and 3) substantially in the central area thereof. The lower flap portion 8 or 8' is connected to the upper flap portion 3 through the fold line 9 which extends laterally from the portion of the cut away portion 6 toward one side edge of the sheet 1 (the right side edge as shown in FIGS. 1 and 3). The other lower flap portion 7 is connected to the lower flap portion 8 or 8' through the fold line 10 which extends longitudinally from the edge adjacent the cut away portion 6 toward the bottom edge of the plate 1, but is separated from the upper flap portion 3 by the cut away portion 6.

The upper flap portion 3 is provided with two apertures 2 spaced from each other at a distance substantially equal to the distance between the eyes of the viewer. A lens 4 held in a frame 5 is removably fitted in each aperture 2. The aperture 2 is preferably constructed in an elliptical or flattened elliptical form so as to permit the lenses to move slightly for adjustment of the distance between them to the viewer's eyes.

Figure 2:
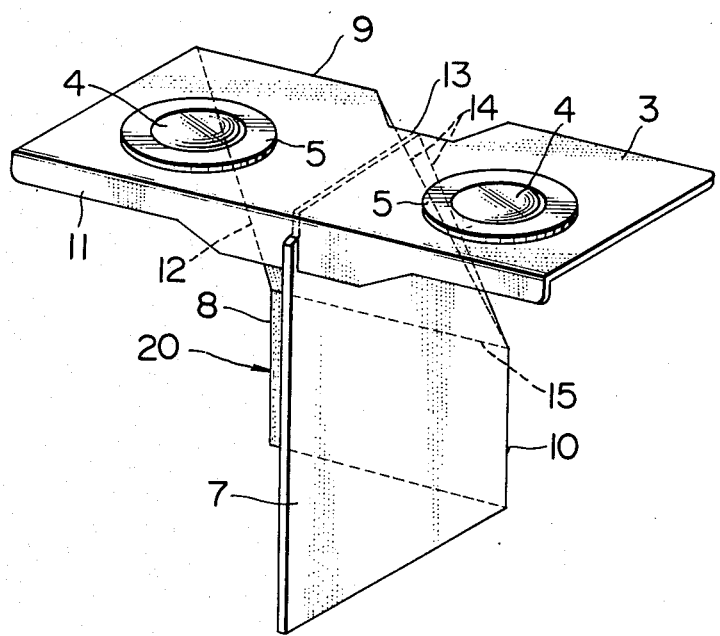
FIG. 2 shows a perspective view of a sheet assembled into a stereoscope.
Figure 4:
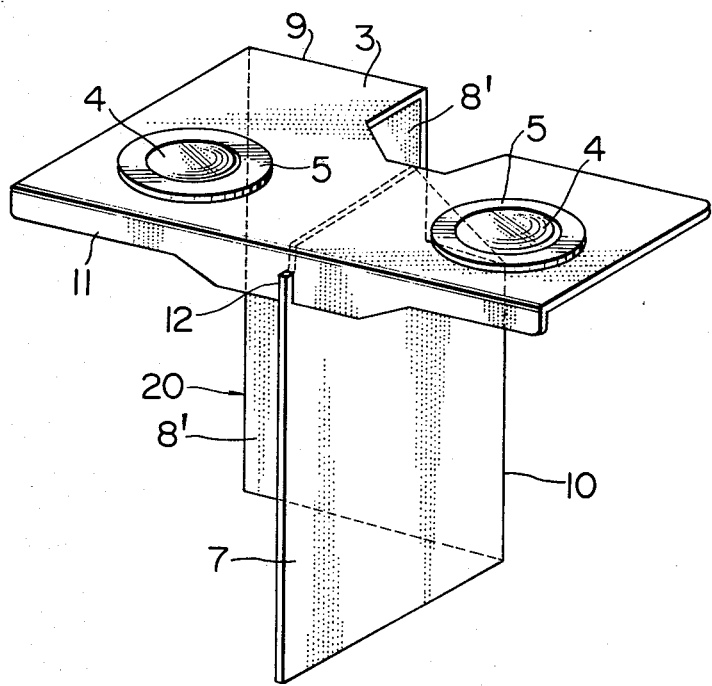
FIG. 4 shows a perspective view of a sheet assembled into a stereoscope similar to that of FIG. 2.

The upper flap portion 3 may be formed with a top flap portion 11 by providing a fold line 16 laterally extending the opposite side edges of the plate 1, between the flap portions 3 and 11. The top flap portion 11 is provided with an elongated cut-out 12. The cut-out 12 functions to frictionally and resiliently clamp the edge 17 provided on the lower flap portion 7 therebetween, when the stereoscope is assembled. The edge 17 is formed by cutting a small rectangular area from the top side corner of the flap portion 7. When the stereoscope 20 is assembled as shown in FIGS. 2 and 4, the lower flap portion 7 serves as a partition wall which separates the left and right stereoscopic photographs with regard to the viewer's eyes. The above-mentioned construction imparts stability and strength to the assembled stereoscope.

The cut-away portion 6 may be formed to accommodated the viewer's nose by enlarging its central portion such as by the provision of a trapezoid portion 13 and a triangle or trapezoid portion 14.

In the embodiment shown in FIGS. 1 and 2, a fold line 15 is provided on the flap portion 8, laterally extending from the portion of the cut away portion 6 toward one side edge of the sheet 1 parallel to the fold line 9. The fold line 15 allows the flap portion 8 to be bent at the fold line 15 when assembled.

In the other embodiment shown in FIGS. 3 and 4, there is no fold line provided on the flap portion 8' and, therefore, the flap portion 8' itself is not bent when assembled.

In assembling the stereoscope, the flap portion 7 is bent or folded at right angles relative to the flap portion 8 or 8' to form legs of the stereoscope therewith. In case of the embodiment shown in FIGS. 1 and 2, after bending of the flap portion 7 to the flap portion 8 the flap portion 8 itself is slightly bent at the fold line 15 and thereafter, bent or folded at substantially right angles relative to the upper flap portion 3 at the fold line 9. In case of the embodiment shown in FIGS. 3 and 4, just after bending of the flap portion 7 to the flap portion 8', the flap portion 8' is folded relative to the upper flap portion 3.

Where the top flap portion 11 together with the cut-out 12 is provided on the upper flap portion 3, the flap portion 11 is folded relative to the upper flap portion 3 and then the edge 17 of the lower flap portion 7 is fitted into the cut-out 12 and frictionally and resiliently held therein to ensure that the assembled stereoscope 20 is rigidly constructed as shown in FIG. 2 or 4.

In use, the assembled stereoscope 20 is placed on the stereoscopic photographs, not shown, so that the lower flap portion 7 is positioned between and perpendicular to the stereoscopic photographs. Thereafter, when the viewer looks at the stereoscopic photographs through the lenses 4 with his nose placed in the cut-away portions 13 and 14, he is able to view a stereoscopic image.

What is claimed is:

1. A folded stereoscope which comprises a relatively rigid sheet generally in the form of a rectangle provided with a cut away portion cut from one side edge of the rectangle, the sheet comprising an upper flap portion provided with two apertures spaced at a distance substantially equal to the distance between human eyes, each of said apertures being provided with a removable lens, a first lower flap portion connected to said flap portion through a first fold line and a second lower flap portion connected to said first lower flap portion through a second fold line and separated from said upper flap portion by said cut away portion.

2. A folded stereoscope as defined in claim 1 wherein said sheet further includes a top flap portion connected to said upper flap portion through a third fold line, said top flap portion being provided with a cut-out adapted to frictionally and resiliently clamp the edge of said second lower flap portion in the assembled state.

3. A folded stereoscope as defined in claim 1 wherein said cut away portion includes a central enlarged portion adapted to accommodate the viewer nose.

4. A folded stereoscope as defined in claim 1 wherein said first lower flap portion includes a fourth fold line extending laterally from the bottom edge of said cut away portion toward one side edge of the sheet.

5. A folded stereoscope as defined in claim 1 wherein said aperture is shaped to allow the lens to laterally move within the aperture 6. A folded stereoscope which comprises a first sheet provided with two apertures spaced from each other at a distance substantially equal to the distance between human eyes, each of said apertures being provided with a removable lens, a second sheet folded from said first sheet at substantially right angles at a first fold line, a third sheet folded from said second sheet at substantially right angles at a second fold line and perpendicular to said first sheet and a fourth sheet folded from said first sheet at substantially right angles at a third fold line and parallel to said second sheet, said fourth sheet being provided with a cut-out for frictionally and resiliently clamping the edge of said third sheet.

7. A folded stereoscope as defined in claim 6 wherein said second sheet consists of two sheet portions connected by a fourth fold line, one of said portions being connected to said first sheet through said first fold line, the other of said portions being connected to said one of said portions through said fourth fold line and connected to said third sheet through said second fold line, said fourth fold line being parallel to said first fold line.

* * * * *